Patented Sept. 14, 1954

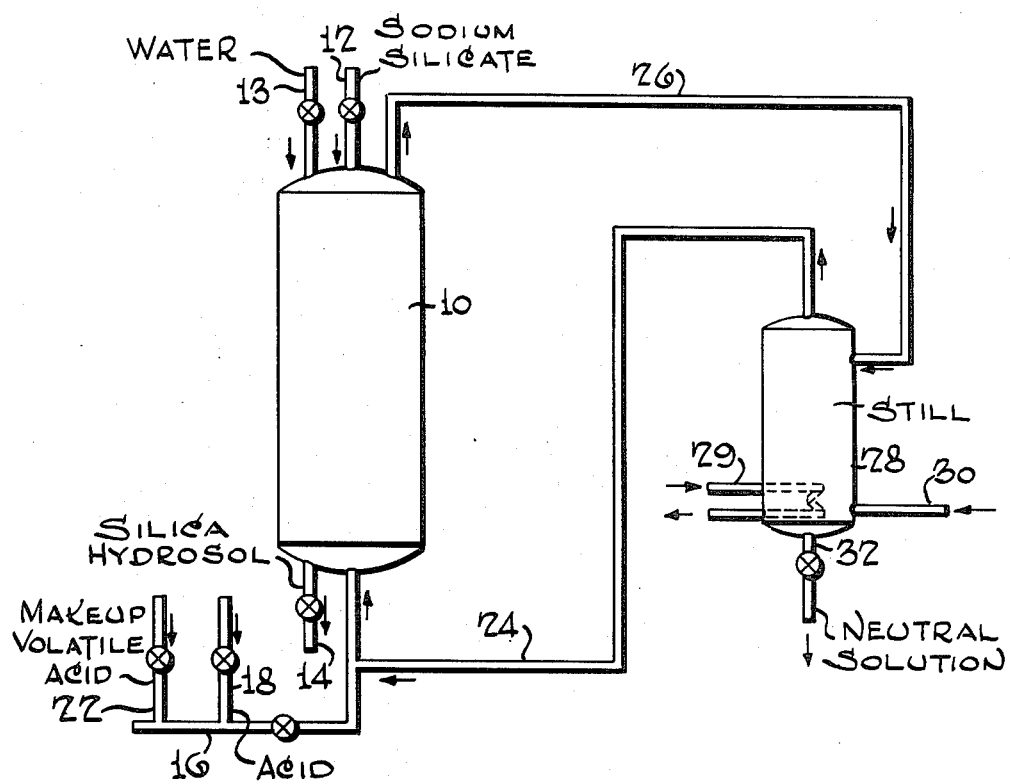

2,689,229

UNITED STATES PATENT OFFICE 2,689,229

REGENERATION OF ION-EXCHANGE MATERIALS

Charles N. Kimberlin, Jr., and Elroy M. Gladrow, Baton Rouge, La., assignors to Standard Oil Development Company, a corporation of Delaware Application December 4, 1951, Serial No. 259,874

7 Claims. (Cl. 260—2.2)

This invention relates to the regeneration of cation exchange materials and more particularly relates to the regeneration of cation exchange materials which have been used in the production of silica hydrosols from alkali metal silicate solutions.

In the preparation of silica hydrosols the alkali metal silicate solution is contacted with the acid form of the cation exchange material. With the proper contacting conditions the sodium ions can be made to replace the hydrogen ions on the exchanger. Because the exchanger has a finite capacity which can be expressed in terms of chemical equivalents per liter of exchanger, the sodium ions effectively replace all of the hydrogen ions and the exchange operation must be interrupted to regenerate the ion exchange material back to the hydrogen form. This is accomplished by changing the environment of the exchanger so that hydrogen ions can be made to replace the sodium ions on the exchanger, this generally being done by treatment with an acid. After the acid treatment, the exchanger material is washed with distilled water. After washing, the acid regenerated cation exchange material is then ready for another exchange cycle to make additional silica hydrosol.

When washing or rinsing with water is described in this application, distilled water is preferred, however other types of water may be used if desired.

In the acid regeneration of cation exchange material there is normally used an excess of acid to obtain satisfactory regeneration, the excess acid amounting to about 50 to 100% more of the acid than the stoichiometric amount required. Normally, the use of excess acid is undesirable because it results in the waste of valuable acid and also it presents an undesirable acid disposal problem.

According to the present invention these undesirable features accompanying the use of an excess of regenerating acid are overcome by using a volatile acid such as sulfurous acid or $SO_2$, or preferably a mixture of sulfurous acid and an acid such as sulfuric acid or hydrochloric acid or phosphoric acid or the like, preferably sulfuric acid. Or the regeneration of the cation exchange material may be carried out by using the sulfurous acid or $SO_2$ first and then following this treatment with an acid such as sulfuric acid. Or the sulfuric acid may be used first.

The sulfuric acid or the like is used in approximately the stoichiometric amounts with respect to the cations to be removed from the exchange material to be regenerated and any desired excess of acid is supplied in the form of a volatile acid such as sulfurous acid or $SO_2$. The spent regenerant or liquid effluent from the regeneration step is then passed to a distillation zone where the excess of sulfurous acid or $SO_2$ is distilled overhead for reuse in another regeneration step leaving as bottoms an essentially neutral solution of sodium or alkali metal sulfate (when using sulfuric acid) which can be recovered as a valuable by-product or which can be disposed of without difficulty. Instead of sulfurous acid, other volatile acids capable of being distilled overhead may be used.

In the drawing there is diagrammatically shown one form of apparatus which may be used for carrying out the process of the present invention.

Referring now to the drawing the reference character 10 designates a vessel containing a stationary granular bed of cation exchange material in the hydrogen cycle ready for an exchange cycle for treating a sodium or alkali metal silicate solution to produce silica hydrosol. The sodium or other alkali metal silicate solution is introduced into the top of vessel 10 through line 12 and passed down through vessel 10 in contact with the cation exchange material, and silica hydrosol having a relatively high concentration of silica is withdrawn through line 14 and further treated as desired to make silica gel, or silica containing catalysts, etc. Preferably, the flow of alkali metal silicate solution is downward and the flow of regenerating acid in the regeneration step is upward.

After the exchange material in vessel 10 has been in use for some time, the effective capacity of the resin becomes utilized, that is the silica hydrosol effluent contains increasing amounts of alkali metal ions due to the depletion of replaceable hydrogen ions from the exchanger. The resin exchanger during the exchange step is essentially converted to the sodium or alkali metal ion form and these ions must be replaced by hydrogen ions to regenerate the exchange material.

In the normal process the exchange material after an exchange step involving production of silica hydrosol is first washed with water, preferably in the same direction of flow as the silicate solution, to remove silica hydrosol remaining in the bed of exchanger. The exchange material is then treated with acid to replace the alkali metal ions with hydrogen ions and the exchanger is then washed or rinsed with water to remove residual acid from the bed.

In the drawing there is shown a single exchange material vessel but usually about four such vessels will be on the regeneration cycle and the others on a wash or rinse cycle. Preferably the regenerating acid is passed upwardly through vessel 10 or in a direction opposite to the direction of flow of liquid in the exchange step.

As the exchange material it is preferred to use a resin exchange material of the acid regenerated cation type. Such cation exchange resins are available as commercial products. One method of producing such resinous materials is to condense aldehydes, such as formaldehyde, with phenols or phenol-sulfonic acids or with phenol-carboxylic acids or the like. Other exchange materials which may be used are sulfuric acid treated coal or wood or waste petroleum sludge or lignite or the like. Also the sulfonated polystyrene type exchange resins may be used. These exchange materials are treated before use with an acid such as sulfuric acid to put the resin in the hydrogen cycle. Exchange resins of the type above described are sold by Resinous Products and Chemical Company under the name of Amberlite.

The volume of alkali metal silicate solution which can be processed to form silica hydrosol per volume of wet acid form resin will be dependent upon the alkali metal ion concentration in the influent silicate solution and the level of concentration of metal ions that may be tolerated in the effluent silica hydrosol. In general, silica hydrosols having alkali metal ion concentrations of the order of 0.2% or less (dry basis) can be prepared by adding alkali metal ions in the silicate solution equivalent to about 75–90 per cent, preferably about 80 per cent, of the number of equivalents of replaceable hydrogen ions associated with the acid form of the exchanger.

In practice it is preferred to predetermine the exchange capacity of exchanger bed 10 by means of a small experimental exchange bed to which sodium silicate is fed having a composition the same as that introduced to exchanger 10 by line 12. The hydrosol effluent from the experimental bed may be collected in increments and analyzed for soda. The data thus obtained may be used to calculate the capacity of exchange bed 10. In order to allow a reasonable safety factor it is preferred to use only about 75 to 90% of this calculated capacity.

After the resin or exchange material has been used to process this much silicate solution the effective capacity of the resin to produce essentially metal-free silica hydrosol has been utilized and it is necessary to regenerate the resin. The flow of alkali metal silicate through line 12 is stopped and the resin is washed with about 0.5 to 2.0 volumes of water per volume of resin in the same direction of flow by means of line 13 to remove a solution of soluble material through line 14. An aqueous acid solution such as sulfurous acid or $SO_2$, sulfuric acid, or mixtures of these acids is passed through line 16 into the bottom of vessel 10. While sulfurous acid alone may be used, it is preferred to add sulfuric acid through line 18 to line 16. Make-up sulfurous acid is introduced into line 16 through line 22. Also introduced into line 16 is recycle sulfurous acid or $SO_2$ in line 24 as will be presently described.

The acid regenerating solution passes upwardly through the exchange material in vessel 10 and leaves the top of vessel 10 through line 26 through which it passes to distillation vessel 28 provided with a heating coil 29 for recovery of the excess volatile acid. The distillation vessel 28 is preferably operated at a temperature of about 150° F. to 212° F. to remove excess volatile acid or $SO_2$ which passes overhead from vessel 28 and is recycled to the line 16 via line 24 as above described. If desired, air or an inert gas such as nitrogen, gaseous hydrocarbons, etc., may be introduced into still 28 by line 30 and passed upwardly therethrough to facilitate vaporization of the $SO_2$ during heating of the still contents. The bottoms from distillation vessel or tower 28 are withdrawn through line 32 and comprises a substantially neutral solution containing sodium or other alkali metal salt of the non-volatile acid used in the regeneration.

The sodium silicate solution used may be any sodium silicate from $2Na_2O \cdot SiO_2$ to $Na_2O \cdot 3.9SiO_2$, preferably $Na_2O \cdot 2.6SiO_2$ to $Na_2O \cdot 3.5SiO_2$. When using sodium silicate in the composition range of $Na_2O \cdot 2.6SiO_2$ to $Na_2O \cdot 3.5SiO_2$ the concentration of silica may be between about 30 and 150 grams $SiO_2$ per liter of solution, preferably less than 100 g./l. The concentration of the regenerative acid solutions may be between about 2 and 10% by weight. The temperature during the ion exchange step may be between about 32° and 100° F. The regeneration step can be carried out at room temperature although higher or lower temperatures are permissible. The rate of flow of the sodium silicate through the resin exchange material in vessel 10 may be between about 0.1 and 1.0, preferably 0.3 to 0.5, gallons per minute per cubic foot of resin.

After the regeneration step and with the flow of acid stopped, the resin in vessel 10 is washed with water introduced through line 13 to remove the residual free acid and salt or salts from the regeneration step. The direction of flow of the water is not critical but it is preferred that the water flow in the same direction as the direction of flow of the sodium silicate solution through vessel 10. The volume of water added in this manner may be between the ranges of 0.5 to 2.0 volumes of water per volume of resin bed. The wash water or rinsings are withdrawn through line 14 and preferably passed to distillation vessel 28 to recover acid and salt or salts.

Preferably, the sodium silicate is first acidified with an acid such as sulfurous acid, acetic acid, etc. to make an acid hydrosol before passing through the cation exchange material in vessel 10 as described in copending applications, Kimberlin Ser. No. 239,612 filed July 31, 1951 and Kimberlin et al. Serial No. 241,952, filed August 15, 1951. Instead of a stationary bed of granular exchange material in vessel 10, the sodium silicate solution may be mixed with the granular acid regenerated cation exchange material as a slurry by providing a mixer or by blowing air or inert gas such as natural gas through the vessel 10 to agitate the contents thereof. When regenerating the exchange material, it is preferred to flow the acid upwardly through the resin bed while maintaining the granular resin bed substantially fixed.

The silica hydrosol made according to this process contains about 3 to 15% by weight of silica and is substantially pure containing less than about 0.2% by weight of $Na_2O$ based on solids content so that the silica hydrosol may be set to a gel and dried and used without a washing step. Or the silica hydrosol may be mixed with alumina hydrosol or other sols to form catalysts after gelling and drying.

Instead of adding a mixture of sulfurous acid and sulfuric acid, it is within the contemplation of the invention to first pass a part or all of the sulfuric acid over the resin and then pass the sulfurous acid over the resin or pass all or part of the sulfurous acid first, followed by the passage of the sulfuric acid over the resin. For example, the stoichiometric amount of sulfuric acid may be passed over the resin to regenerate the major proportion of the resin and so that there is no excess of sulfuric acid and then the sulfurous acid or $SO_2$ is passed over the resin in excess of the stoichiometric amount of acid to substantially complete the regeneration of the resin. By completely neutralizing the sulfuric acid there is no wastage of sulfuric acid and no acid disposal problem. By using an excess of sulfurous acid, substantially complete regeneration is ensured and the excess sulfurous acid is recovered as $SO_2$ in distillation zone 28 and reused in the process.

For the purposes of illustration the following examples show the efficacy of regeneration with mixed acids or with the volatile acid alone as compared with the conventional process employing sulfuric acid. An exchange resin bed comprising a column of granular Amberlite IR-120 exchange resin obtained from the Resinous Products and Chemical Company is prepared for use by treatment with a large excess of 5% sulfuric acid solution followed by a complete water wash. Amberlite IR-120 is a water-insoluble sulfonated polystyrene resin. This exchange bed is then used in an exchange cycle for removal of soda from a dilute solution of sodium silicate during which it removes from the solution a total of about 45 grams of soda ($Na_2O$) or about 1.46 chemical equivalents of soda per liter of exchange resin. After the exchange step the exchange bed is rinsed with water using about two volumes of water per volume of exchange resin. The exchange bed is now ready for regeneration. The acid regeneration rate is about 0.3 gallons per minute per cubic foot. In each of the following examples the exchanger resin bed at the beginning of the operation contains about 1.46 chemical equivalents of soda per liter of exchange resin bed.

At first one method of producing silica hydrosol will be given as an example and then the regeneration of the cation exchange material will be given in detail.

Sodium silicate solution containing about 30 grams of $SiO_2$ per liter of solution is passed through a bed of granular Amberlite resin IR-120 (sulfonated polystyrene cation exchange resin) to obtain a sol containing about 2.8% by weight of silica. The volume of the resin bed is about 1 liter. The contacting step is continued until the exchange resin is substantially completely exhausted for complete soda removal at which time the resin contains 1.46 chemical equivalents of soda per liter of exchange resin. The resin is then washed with water using about 2 volumes of water per volume of exchange resin.

Using a washed, substantially exhausted Amberlite resin IR-120 (sulfonated polystyrene cation exchange resin), several regeneration treatments will now be given of which Examples 1, 2 and 3 use only sulfuric acid as typifying prior art processes. Examples 4 and 5 illustrate the improvements of the present process.

Example 1

The Amberlite resin IR-120 (sulfonated polystyrene cation exchange resin) having a volume of about 1 liter after use in an exchange cycle as above described and containing about 1.46 chemical equivalents of soda per liter of exchange resin is treated with about 1390 cc. of sulfuric acid solution containing 5% by weight of sulfuric acid, the acid solution containing about 1.46 chemical equivalents of sulfuric acid per liter of exchange resin. The amount of sulfuric acid used is the stoichiometric amount. During regeneration with the sulfuric acid sodium sulfate and sodium bisulfate are formed. The regenerated resin is then washed with distilled water, using about 2 volumes of water per volume of wet resin. The combined regenerant effluent and rinsing water contain about 37 grams of soda ($Na_2O$) or about 1.20 chemical equivalents of soda and 0.26 chemical equivalents of unused acid, leaving about 8 grams of soda ($Na_2O$) or about 0.26 chemical equivalents of soda remaining on the exchange resin.

In this example regeneration of the resin is incomplete and sulfuric acid as such is present in the regenerant effluent and rinsing water to present a waste disposal problem. Evaporation of the combined regenerant effluent and rinsings gives a mixture of sodium sulfate and sodium bisulfate due to the presence of the residual sulfuric acid.

Example 2

Another substantially exhausted Amberlite IR-120 (sulfonated polystyrene cation exchange resin) exchange resin bed having a volume of about one liter and containing 1.46 chemical equivalents of soda or about 45 grams of soda ($Na_2O$) per liter of resin is treated with about 1875 cc. of a 5% sulfuric acid solution containing 1.97 chemical equivalents of sulfuric acid per liter of exchange resin. The regenerated exchange resin is rinsed with water, using about two volumes of water per volume of wet resin. The combined regenerant effluent and rinsings contain about 43 grams of soda ($Na_2O$) or about 1.40 chemical equivalents of soda as sodium sulfate and bisulfate and 0.57 equivalents of unused acid leaving about 0.06 equivalents of soda remaining or about 2 grams of soda ($Na_2O$) on the exchanger. While this Example 2 shows an improvement in the regeneration as compared to Example 1, the regeneration is still incomplete and there is still free sulfuric acid after regeneration to be disposed of. Evaporation of the combined regenerant effluent and rinsings yields a mixture of sodium sulfate and sodium bisulfate due to the excess of sulfuric acid.

Example 3

Another substantially exhausted Amberlite IR-120 (sulfonated polystyrene cation exchange resin) exchange resin bed having a volume of about 1 liter and containing soda in the amount above described is treated with about 2080 cc. of a 5% sulfuric acid solution containing 2.19 chemical equivalents of sulfuric acid per liter of exchange resin. The regenerated resin is rinsed with water, using about two volumes of water per volume of wet resin. The combined regenerant effluent and rinsings contain 1.46 equivalents of soda as sodium sulfate and bisulfate and 0.73 equivalents of unused acid, leaving the exchange resin completely soda-free. This example serves to illustrate complete regeneration of the exchange resin to the hydrogen form of the exchanger. In this example, however, there is more unused sulfuric acid left in the effluent for disposal. Evaporation of the combined regenerant effluent and rinsings yields a mixture of sodium sulfate and sodium bisulfate due to the excess of sulfuric acid.

*Example 4*

Another substantially exhausted Amberlite IR–120 (sulfonated polystyrene cation exchange resin) exchange resin bed having a volume of about 1 liter and containing soda in the amount above given is treated with a mixture containing 1.46 chemical equivalents of sulfuric acid and 0.73 chemical equivalents of sulfurous acid (calculated as monobasic acid) per liter of exchange resin. This amounts to 1390 cc. of 5% sulfuric acid in which are dissolved about 47 grams of sulfur dioxide. The regenerated exchange resin is rinsed with water, using about two volumes of water per volume of wet resin. The combined regenerant effluent and rinsing water contain 1.46 chemical equivalents of soda as sodium sulfate, bisulfate and bisulfite and 0.73 chemical equivalents of unused acid, leaving the exchange resin completely soda-free. The combined regenerant effluent and rinsings contain $Na_2SO_4$, $NaHSO_4$, $NaHSO_3$, $H_2SO_4$ and $H_2SO_3$ in equilibrium in solution. The excess acid may be recovered from this multicomponent solution in the form of sulfur dioxide by distillation or some other suitable means such as heating in a stream of air or other inert gas which causes the following reactions to occur in the solution:

(1) $H_2SO_4 + NaHSO_3 \longrightarrow NaHSO_4 + H_2O + SO_2 \nearrow$ (2) $NaHSO_4 + NaHSO_3 \longrightarrow Na_2SO_4 + H_2O + SO_2 \nearrow$ Removal of the sulfur dioxide from the system causes the above reactions to go to completion as indicated. In this manner all sulfuric acid and sodium bisulfate are converted to sodium sulfate and all bisulfites are converted to sulfurous acid which in turn yields sulfur dioxide gas leaving an essentially neutral solution of sodium sulfate which may be recovered from solution by evaporation or crystallization. Where it is desired to obtain an essentially neutral sodium sulfate as in this example it is important to use no more than the stoichiometric amount of sulfuric acid in the regeneration of the exchange resin and to make up any excess of acid needed for efficient regeneration with sulfurous acid.

This Example 4 illustrates complete regeneration of the exchange resin to the hydrogen form using a mixture of sulfuric and sulfurous acids in which the sulfuric acid content alone would be insufficient to effect complete regeneration as illustrated above in Example 1.

In Example 4, use of sulfuric acid in an amount stoichiometric with the soda content of the cation exchanger with the necessary additional acid being of a volatile and recoverable nature eliminates an acid waste disposal problem and allows for the formation of sodium sulfate in essentially pure form which may be recovered, if desired, as above described.

While in Example 4, the stoichiometric amount of sulfuric acid was used, it is to be expressly understood that amounts of sulfuric acid less than the stoichiometric amount can be used in which event more of the sulfurous acid will be needed than is used in Example 4 to obtain complete regeneration of the exchange resin.

*Example 5*

Another substantially exhausted Amberlite IR–120 (sulfonated polystyrene cation exchange resin) exchange resin bed having a volume of about 1 liter and containing soda in the amount above given is treated with about 2460 cc. of a 7% by weight sulfurous acid solution containing about 2.19 chemical equivalents (calculated on the basis of sulfurous acid being monobasic) per liter of exchange resin. The regenerated resin is rinsed with water using about two volumes of water per volume of wet resin. The combined regenerant effluent and rinsings contain 1.46 equivalents of soda as sodium bisulfite and 0.73 equivalents of unused acid, leaving the exchange resin soda-free. This example serves to illustrate the complete regeneration of the exchange resin to the hydrogen form using a volatile and recoverable acid to effect the regeneration. The excess or unused sulfurous acid may be recovered simply by distilling overhead from the spent regenerant and rinsings; or the sulfurous acid may be recovered in toto by adding to the spent regenerant and rinsings, sulfuric acid chemically equivalent to the soda removed from the resin and distilling the sulfurous acid overhead.

While these specific examples serve to illustrate that both sulfurous acid alone and sulfurous-sulfuric acid mixtures are satisfactory for regeneration in the concentrations indicated it is within the contemplation of the invention to employ lower or higher acid concentrations than those cited in the examples to suit the needs of the particular process. It is possible to mix sulfurous acid with sulfuric acid in any proportions and still effect complete regeneration.

While our process has been specifically described in connection with the production of silica hydrosols by treatment of sodium silicate solutions with ion exchange resins, our process of regenerating ion exchange resins may be employed in connection with any ion exchange process employing cation ion exchange resins in the hydrogen cycle as for example in the complete deionization of water.

What is claimed is:

1. A method of regenerating a cation exchange resin following an exchange cycle wherein silica hydrosol was produced from an alkali metal silicate solution in an exchange cycle, which comprises treating the used exchange resin containing exchangeable alkali metal ions with both sulfuric acid and sulfurous acid, the total amount of acid being such as to substantially completely regenerate the resin, the sulfuric acid being used in an amount substantially chemically equivalent to the alkali metal ions, the sulfurous acid, calculated as a monobasic acid, being used in an amount sufficient to substantially complete the regeneration of the resin, passing the resulting solution containing bisulfite ions to a distillation zone to remove and recover substantially the total bisulfite content of the solution.

2. A method according to claim 1 wherein the sulfuric acid and sulfurous acid are used in admixture.

3. A method according to claim 1 wherein inert gas is passed through the solution during distillation.

4. A method of regenerating a cation exchange material following an exchange cycle wherein alkali metal cations are removed from an aqueous solution, which comprises treating the used exchange material containing exchangeable alkali metal cations with both sulfuric acid and sulfurous acid, the total amount of acid being such as to substantially completely regenerate the exchange material, the sulfuric acid being used in an amount substantially chemically equivalent to the exchangeable alkali metal cations in the exchange material, the sulfurous acid, calculated as a monobasic acid, being used in an amount sufficient to substantially complete the regeneration of the exchange material, passing the resulting solution containing bisulfite ions to a recovery zone, heating said resulting solution in said recovery zone to remove and recover substantially the total bisulfite content of the solution.

5. A method according to claim 4 wherein the sulfuric acid and sulfurous acid are used in admixture.

6. A method according to claim 4 wherein inert gas is passed through the heated solution in said recovery zone.

7. A method according to claim 4 wherein said recovery zone is a distillation zone.

References Cited in the file of this patent

UNITED STATES PATENTS

| Number | Name | Date |
|---|---|---|
| 2,366,651 | Rawling | Jan. 7, 1945 |
| 2,564,820 | Smit | Aug. 21, 1951 |

OTHER REFERENCES

Laboratory Manual Amberlite Ion Exchange Resins, pages 6–8, Rohm and Haas Co., Philadelphia, October 1946.

Mellor: A Comprehensive Treatise on Inorganic and Theoretical Chemistry, vol. II, page 527 (1922), and vol. X, page 260 (1930), Longmans, Green and Co., New York.

Serial No. 359,575, Smit (A. P. C.), published May 11, 1943.